P. H. LAWRENCE.
Improvement in Apparatus for Cutting the Casings of Tubes in Oil Wells.
No. 5,092. Reissued Oct. 8, 1872.
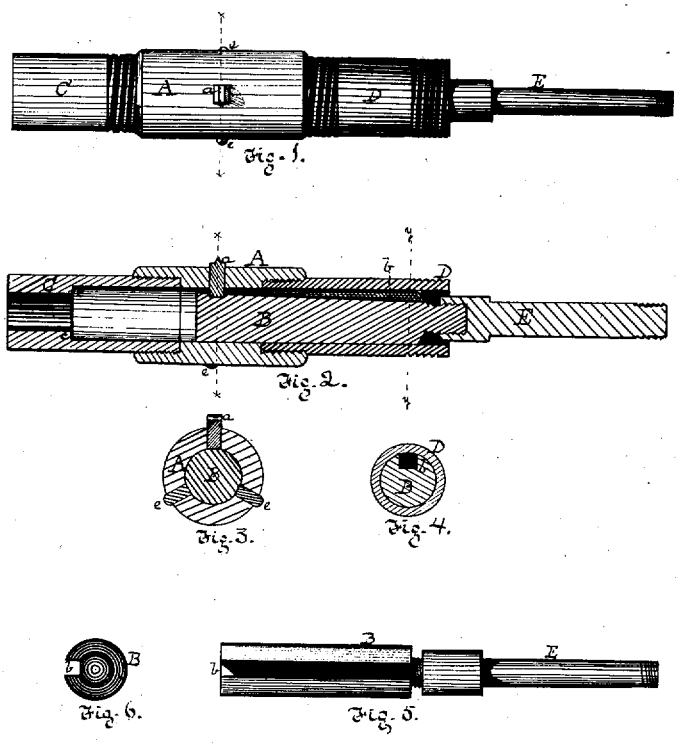
WITNESSES.
R. W. Winchell
James S. Kay
INVENTORS and Assignee.
Perley H. Lawrence,
James H. Lutter,
by Bakewell, Christy & Kerr,
their Att'ys.

UNITED STATES PATENT OFFICE.

PERLEY H. LAWRENCE, OF PETROLEUM CENTRE, PENNSYLVANIA, ASSIGNOR OF ONE-HALF INTEREST TO JAMES H. LUTHER, OF SAME PLACE.

IMPROVEMENT IN APPARATUS FOR CUTTING THE CASINGS OR TUBES IN OIL-WELLS.

Specification forming part of Letters Patent No. 105,156, dated July 5, 1870; reissue No. 5,092, dated October 8, 1872.

*To all whom it may concern:*

Be it known that PERLEY H. LAWRENCE, of Petroleum Centre, in the county of Venango and State of Pennsylvania, has invented a new and useful Improvement in Apparatus for Cutting Casings; and we do hereby declare the following to be a full, clear, and exact description thereof, reference being had to the accompanying drawing making a part of this specification, in which—

Figure 1 is an exterior view of the cutting apparatus, showing the cutting-tool or spur protruding through the case, and also illustrative of the connections; Fig. 2 shows a longitudinal section of Fig. 1; Fig. 3 shows a cross-sectional view through *x x*, Figs. 1 and 2; Fig. 4 is a like view through *y y*, Fig. 2; Fig. 5 represents an exterior view of the plug with its inclined groove, and of a joint of the connecting-rod; and Fig. 6 is a lower-end view of the plug.

Like letters of reference indicate like parts in each.

What is known in oil, salt, or other artesian wells as a "casing" consists of a pipe of a little less diameter than the bore of the well, extending down from the mouth of the well to a point below the fresh-water stratums, and usually to a depth of from one to five hundred feet. A seed-bag or other suitable packing is placed around the casing at or near its lower end, and between it and the wall of the well, for the purpose of excluding from the well-chamber below, such fresh or surface water as would otherwise flow into the well and interfere with or totally destroy its productiveness. Such casing is commonly put in as soon as the drill has passed through the lowest fresh-water stratum, and the further drilling of the well is carried on through the casing. Then, in case the well proves to be a "dry hole," or if it produces at first and afterward becomes "dry," (that is, unproductive in paying qualities,) it is desirable, in order that the loss may be as little as possible, to remove the casing and use it in another well. This ordinarily is very difficult, and previous to this invention was frequently impossible, since the seed-bag on the lower end of the casing operated like a wedge to hold it in place, and often pieces of rock, earth, &c., would accumulate and pack in between the casing and wall of the well to such an extent and with such solidity that the casing could not be "drawn" by any means then known. The entire casing was then a total loss.

The object of this improvement is to enable the operator while working at the surface to cut the casing transversely at any desired point, either just above the seed-bag or, if the casing is wedged in at other points by external obstructions, to cut it at or just above or below such points, so that it may be taken out in sections, and all except the cut lengths be saved for future use; and the nature of this invention consists in the features of construction and operation substantially as hereinafter set forth and claimed.

To enable others skilled in the art to make and use this improvement, we will proceed to describe its construction and mode of operation.

The head or stock A we make hollow, of cast metal, and a little less in exterior diameter than the interior diameter of the casing to be cut. It is threaded internally at each end, and the central portion is bored out smooth to admit of the free motion of the plug B up and down therein. In its lower end a piece of pipe, C, having a shoulder, *c*, is screwed, so that such shoulder shall form a stop for the slide B to limit the length of its downward motion relative to the stock A. In the central portion of the stock A are fitted one or more spurs or cutting-tools, *a*, which are inserted so as to move freely in and out. Their bases operate each against the bottom of an inclined groove, *b*, made in the sliding plug B. Each groove is deepest at the upper end, and becomes shallowed toward the lower end, so that as the plug B is raised, the stock A being stationary, the bottom of the groove will act like a wedge against the base of the cutter *a* to thrust it out against the casing. At various points in the plane of the cutter *a*, as illustrated in Fig. 3, are arranged friction-rollers or studs *e e*, which, bearing against the inside of the casing, hold the stock centrally therein while it is being cut. To the upper end of the tool-stock A is screwed a joint or length of tubing, D, by successive lengths of which a connection is made with the apparatus from the top of the well. A length of sucker-rod, E, is screwed onto the upper end of the plug *b*, and, by successive lengths screwed on, a like connection is made with the mouth of the well. By these extensible connections the apparatus can be brought to operate at any desired point on the casing, wherever it may be desired to cut it for the purpose of facilitating its removal.

When it is desired to cut and remove the casing of a well the plug B is allowed to drop down and rest on the shoulder *c*. The cutter *a* is thus permitted to be drawn in, its base resting in the deepest part of the groove *b*. It is then lowered down the well, successive lengths of casing D and sucker-rods E being screwed on as it goes down. When it has reached the point at which it is desired to cut the casing, the sucker-rod connection and with it the plug B is raised so as to force the cutter *a* outward with its cutting end against the inside of the casing. This pressure is kept up and at the same time, by means of the tube-connection D, the apparatus is rotated till the cutter *a* has been forced through the casing all around, and the part cut off is free to be removed in the usual way.

What we claim as the invention of the said PERLEY H. LAWRENCE, and desire to secure by Letters Patent, is—

1. An extensible connection, consisting of sucker-rods E and tubing D, in combination with back rests *e* and cutter *a*, the latter forced out or drawn in by means of the sucker-rods E, and rotating against the inside of the casing by means of the line of tubing D, substantially and for the purposes set forth.

2. In combination with stock A and cutter *a*, the sliding plug B with its inclined groove *b* and pipe C with its shoulder *c* relatively arranged, substantially as and for the purposes set forth.

3. As a step in the art of "drawing" casing, cutting the same into lengths while in the well in immediate contiguity to the obstructions by means of a cutter or cutters operated outwardly against the inner face of the casing, by power applied at the mouth of the well through the medium of interposed extensible connections, substantially in the manner set forth.

In testimony whereof we, the said PERLEY H. LAWRENCE and JAMES H. LUTHER, have hereunto set our hands.

PERLEY H. LAWRENCE.
JAMES H. LUTHER.

Witnesses:
SAM. REYNOLDS,
W. W. JOHNSTON.